(12) United States Patent
Maeda et al.

(10) Patent No.: US 9,293,974 B2
(45) Date of Patent: Mar. 22, 2016

(54) ELECTRIC MOTOR HAVING STATOR CORE FOR REDUCING COGGING TORQUE

(71) Applicant: FANUC CORPORATION, Yamanashi (JP)

(72) Inventors: Takuya Maeda, Yamanashi (JP); Reo Arai, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 234 days.

(21) Appl. No.: 14/054,955

(22) Filed: Oct. 16, 2013

(65) Prior Publication Data

US 2014/0103755 A1   Apr. 17, 2014

(30) Foreign Application Priority Data

Oct. 17, 2012   (JP) ................... 2012-230093

(51) Int. Cl.
*H02K 7/04* (2006.01)
*H02K 29/03* (2006.01)
*H02K 1/16* (2006.01)

(52) U.S. Cl.
CPC .................. *H02K 29/03* (2013.01); *H02K 1/16* (2013.01); *H02K 7/04* (2013.01); *H02K 2201/06* (2013.01); *H02K 2213/03* (2013.01)

(58) Field of Classification Search
CPC ........... H02K 1/16; H02K 7/04; H02K 29/03; H02K 2213/03; H02K 2201/06
USPC ..................... 310/51, 112, 216.011, 216.048, 310/216.055, 156.01
IPC .............................................. H02K 7/04, 29/03
See application file for complete search history.

(56) References Cited

U.S. PATENT DOCUMENTS

| | | | | | |
|---|---|---|---|---|---|
| 4,764,743 | A | * | 8/1988 | Leupold | H01F 7/0278 335/212 |
| 4,862,128 | A | * | 8/1989 | Leupold | G01R 33/383 315/5.35 |
| 5,698,925 | A | * | 12/1997 | Coupart | H02K 5/20 310/216.011 |
| 7,501,734 | B2 | * | 3/2009 | Takahashi | H02K 1/16 310/216.011 |
| 2005/0029888 | A1 | | 2/2005 | Inayama et al. | |
| 2006/0181173 | A1 | * | 8/2006 | Takahashi | H02K 1/16 310/216.011 |

(Continued)

FOREIGN PATENT DOCUMENTS

| | | |
|---|---|---|
| DE | 20119210 U1 | 1/2002 |
| JP | 04299038 | 10/1992 |

(Continued)

OTHER PUBLICATIONS

The Journal of the Institute of Electrical Engineers of Japan, vol. 103-B, (1983), pp. 711-718.

(Continued)

*Primary Examiner* — John K Kim
(74) *Attorney, Agent, or Firm* — Fredrikson & Byron, P.A.

(57) ABSTRACT

An electric motor includes a stator having a core back which varies in width in a circumferential direction, and a rotor provided with permanent magnets. In the electric motor, cogging torque is generated M times during one revolution of the rotor, due to the number of magnetic poles of the rotor and the varied shape of the core back. The core back is provided with a step shift by an angle obtained by multiplying (360/M/2) degrees with an odd number. According to one embodiment, the core back may be provided with holes, concave portions or convex portions, so as to provide the core back with the step shift.

6 Claims, 15 Drawing Sheets

(56) References Cited

U.S. PATENT DOCUMENTS

2007/0138985 A1*  6/2007  Ley et al. ..................... 318/254
2014/0103755 A1*  4/2014  Maeda et al. .................. 310/51

FOREIGN PATENT DOCUMENTS

| | | |
|---|---|---|
| JP | 08223829 | 8/1996 |
| JP | 08331779 | 12/1996 |
| JP | 2002186204 | 6/2002 |
| JP | 2003111337 | 4/2003 |
| JP | 2005065479 A | 3/2005 |
| JP | 2005304150 A | 10/2005 |
| JP | 2006014457 A | 1/2006 |
| JP | 2008199894 A | 8/2008 |
| JP | 2008228515 | 9/2008 |
| JP | 2009106047 | 5/2009 |
| JP | 2009131050 A | 6/2009 |
| JP | 201155706 A | 3/2011 |
| JP | 2011250690 A | 12/2011 |
| WO | 2008078584 A1 | 7/2008 |

OTHER PUBLICATIONS

Untranslated Office Action for DE102013111288.9, Feb. 4, 2015, 7 pages.
English Machine Translation for Office Action for DE102013111288.9 of Feb. 4, 2015, 5 pages.
English Machine Translation for Japanese Publication No. 2011-250690, published Dec. 8, 2011, 13 pages.
English Abstract, Japanese Publication No. 2002-186204, published Jun. 28, 2002, 1 page.
English Abstract, Japanese Publication No. 2003-111337, published Apr. 11, 2003, 1 page.
English Abstract, Japanese Publication No. 04-299038, published Oct. 22, 1992, 1 page.
English Abstract, Japanese Publication No. 08-331779, published Dec. 13, 1996, 1 page.
English Abstract, Japanese Publication No. 08-223829, published Aug. 30, 1996, 1 page.

* cited by examiner

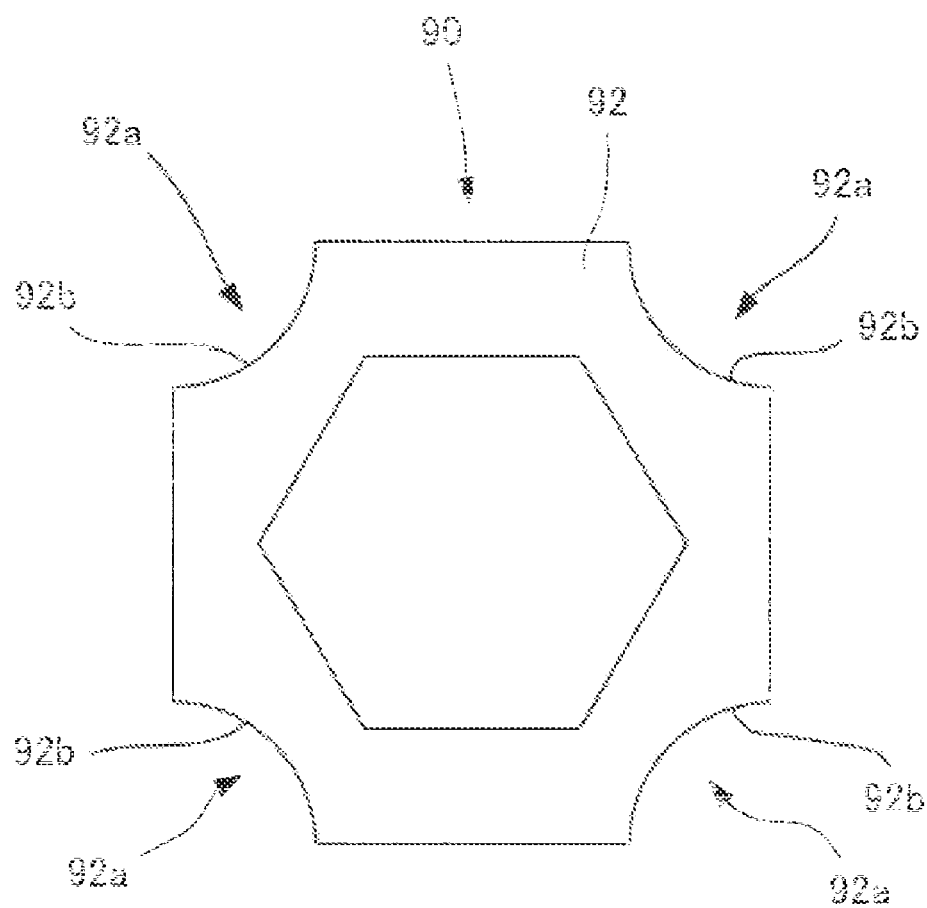

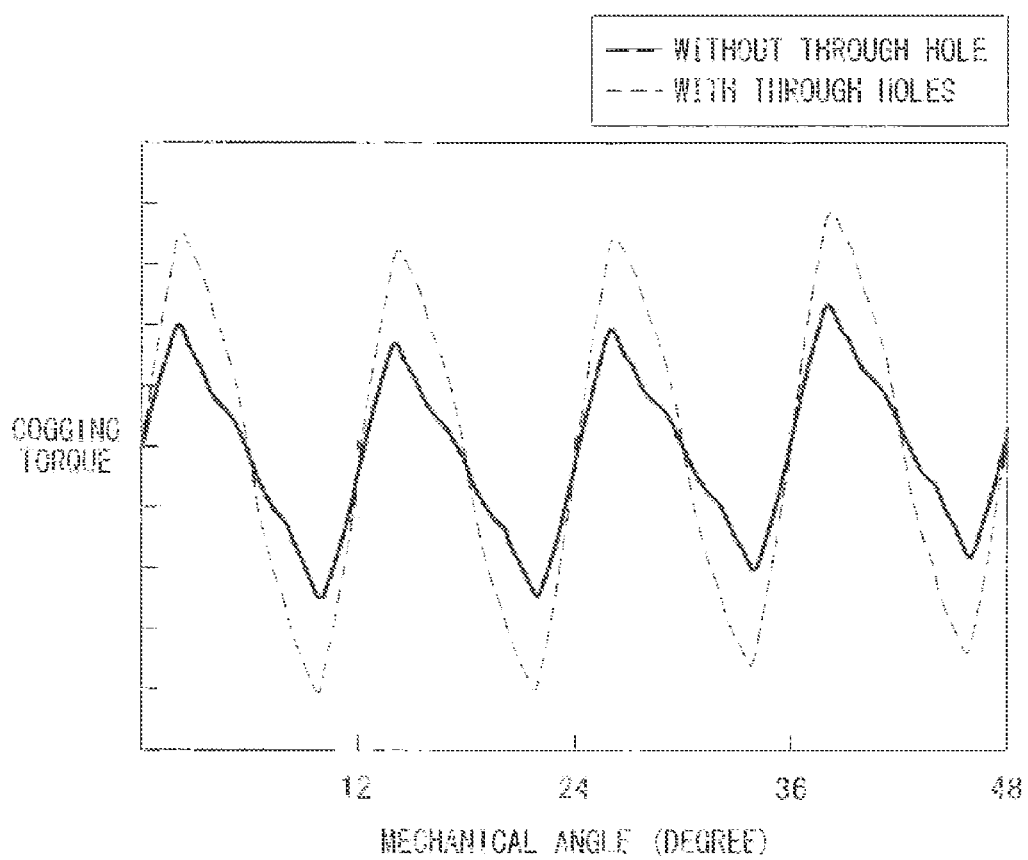

ELECTRIC MOTOR HAVING STATOR CORE
FOR REDUCING COGGING TORQUE

BACKGROUND OF THE INVENTION

1. Field of the Invention

The present invention relates to an electric motor.

2. Description of the Related Art

In an electric motor including a stator provided with slots spaced apart from each other in a circumferential direction and with windings wound around the stator through the slots, and a rotor provided with permanent magnets spaced apart from each other in the circumferential direction and adapted to cooperate with the windings to generate driving torque, it has been known that cogging torque is generated due to various factors. For example, it has been known that during one revolution of an electric motor, cogging torque is generated the same time as the least common multiple of the number of magnetic poles of the rotor and the number of slots of the stator (see the Journal of the Institute of Electrical Engineers of Japan, Vol. 103-B, (1983), pages 711 to 718). In order to prevent such cogging torque, various approaches have been proposed (see JP-A-2005-304150, JP-A-2008-199894, JP-A-2011-55706, JP-A-2005-65479, JP-A-2009-131050 and JP-A-2006-14457).

Therefore, there is a need for an electric motor in which cogging torque is reduced.

SUMMARY OF THE INVENTION

According to a first aspect of the present disclosure, an electric motor comprising a stator provided with slots spaced apart from each other in a circumferential direction and with windings wound around through the slots, and a rotor provided with permanent magnets spaced apart from each other in the circumferential direction and adapted to cooperate with the windings to produce driving torque, wherein the stator includes a core back extending between a circumscribed circle extending through a radially outer edge of the slots and a radially outer edge of the stator, the core back having a size defined in a radial direction, which varies in the circumferential direction, wherein the electric motor being adapted to generate cogging torque M times during one revolution of the rotor, due to the number of magnetic poles of the rotor and the varied size of the core back, and wherein the core back is provided with a step shift by an angle obtained by multiplying (360/M/2) degrees with an odd number, is provided.

According to a second aspect of the present disclosure, in the electric motor according to the first aspect, the core back including holes, concave portions or convex portions, so as to provide the core back with the step shift.

According to a third aspect of the present disclosure, in the electric motor according to the first or second aspect, the core back has a contour of a regular polygon.

According to a fourth aspect of the present disclosure, in the electric motor according to the second aspect, the electric motor is adapted to generate cogging torque N times during one revolution of the rotor, separately from the cogging torque generated M times during one revolution of the rotor, due to the number of magnetic poles of the rotor and the varied size of the core back, wherein the core back includes additional holes, concave portions or convex portions, so as to provide the core back with a step shift by an angle obtained by multiplying (360/N/2) degrees with an odd number.

According to a fifth aspect of the present disclosure, in the electric motor according to any one of the second through fourth aspects, the holes, the concave portions or the convex portions of the core back are equally spaced apart from each other in the circumferential direction.

According to a sixth aspect of the present disclosure, in the electric motor according to any one of the second through fifth aspects, the holes, the concave portions or the convex portions of the core back forms a group of holes, concave portions or convex portions, the holes, the concave portions or the convex portions in the respective group are arranged in a symmetrical manner relative to one another.

These and other objects, features and advantages of the present invention will become more apparent in light of the detailed description of exemplary embodiments thereof as illustrated by the drawings.

BRIEF DESCRIPTION OF THE DRAWINGS

FIG. 9 is a conceptual diagram illustrating an electric motor according to another variant;

FIG. 13 shows a result of detection of cogging torque generated in the electric motor according to the second comparative example;

DETAILED DESCRIPTION OF THE INVENTION

Embodiments of the present invention will be described with reference to the accompanying drawings. The illustrated constituent elements may be modified in size in relation to one another for better understanding of the present invention.

Figure 1:
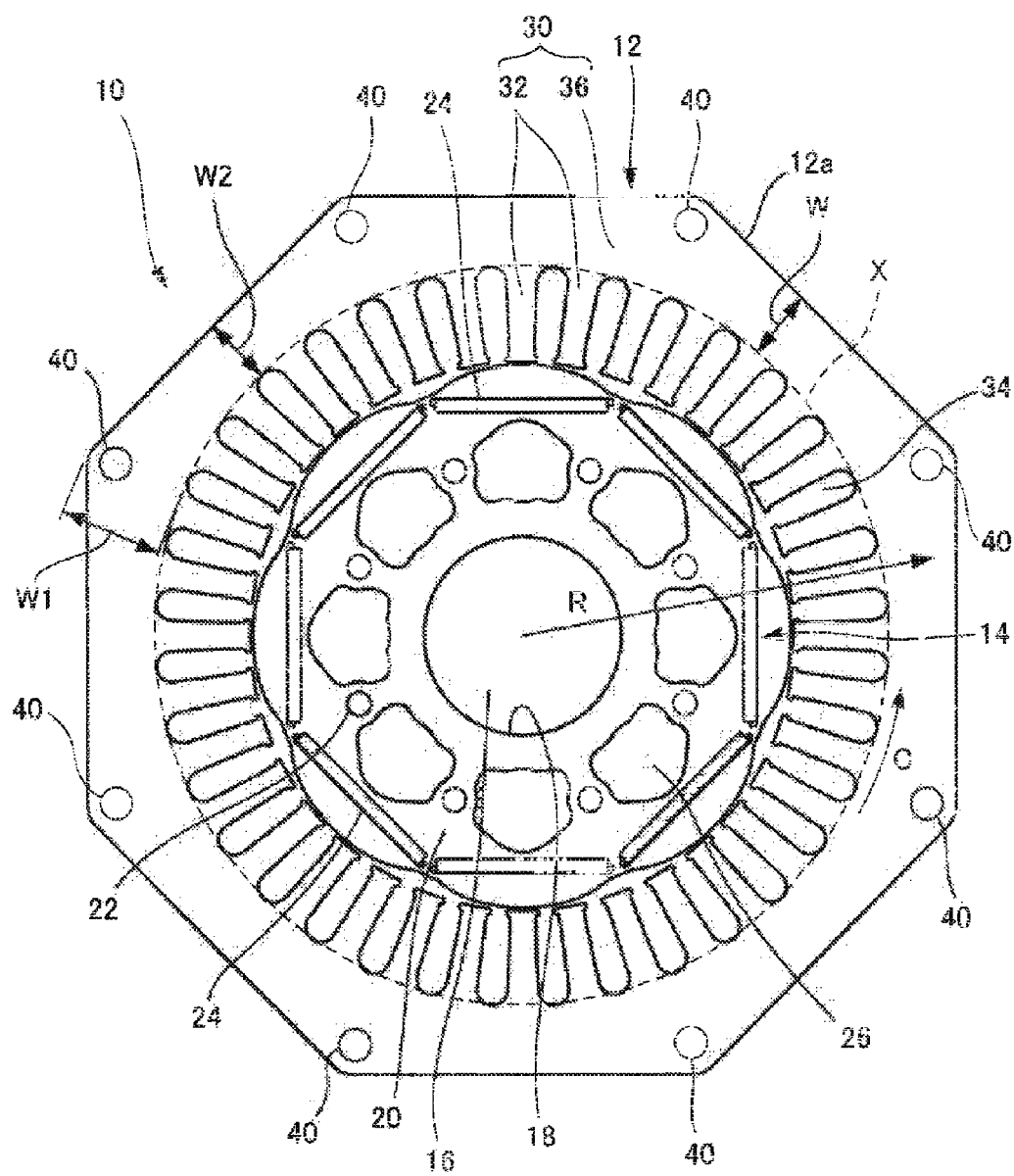
FIG. 1 is a sectional view illustrating an electric motor according to a first embodiment.

FIG. 1 is a sectional view illustrating an electric motor 10 according to a first embodiment. The electric motor 10 includes a stator 12, and a rotor 14 concentrically surrounded by the stator 12. The rotor 14 has a rotor core 20 of a substantially cylindrical shape. The rotor core 20 is formed with a center bore 18 for receiving a shaft 16 rotatably supported by bearings (not shown). For example, the rotor core 20 is formed from a stack of circular steel plates fixed to one another by caulking. The rotor core 20 includes a plurality of, for example, eight permanent magnets 24 embedded therein so as to be spaced apart from each other in a circumferential direction C. The rotor core 20 is also provided with a plurality of through holes 22 and 26 extending through the rotor core 20 in a direction in which the steel plates are stacked on one another. The through holes 22 and 26 are situated at an equal distance from each other in the circumferential direction C.

The stator 12 has a stator core 30 having a contour of regular octagon. The stator core 30 is a hollow member made from a magnetic material and designed to surround the rotor 14. An outer edge of the stator core 30 defines an outer edge 12a of the stator 12, which in turn defines a contour of the electric motor 10. The stator core 30 includes a plurality of teeth 32 projecting inwardly in a radial direction R and being spaced apart from each other in the circumferential direction C. Between the adjacent two teeth 32 there are slots 34. In the illustrated embodiment, thirty-six slots 34 are provided on an inner circumferential surface of the stator core 30. The stator core 30 has a core back 36 extending in the circumferential direction C between a circumscribed circle X (shown by a dashed line in FIG. 1) passing through outer edges of the slots 34 in the radial direction R (i.e., bottoms of the slots 34 or base ends of the teeth 32), and an outer edge 12a of the stator 12 in the radial direction R. The core back 36 serves as a passageway for a magnetic flux during an operation of the electric motor 10. Further, an additional casing (not shown) made of either a non-magnetic material or a magnetic material may also be provided on the outside of the stator 12 in the radial direction R, so as to hold the stator 12.

As can be clearly seen in FIG. 1, in the stator 12 including the stator core 30 having a contour of regular octagon, the core back 36 has a width W in the radial direction R which cyclically changes between a maximum value W1 and a minimum value W2. Specifically, the width W of the core back 36 has the minimum value W2 on lines connecting the center of the stator core 30 and the midpoints of the respective sides of the stator core on the outer edge 12a, while having the maximum value W1 on lines connecting the center of the stator core 30 and the respective vertices of the stator core 30. The width W of the core back 36 cyclically changes in the circumferential direction C, for example, so as to decrease from the maximum value W1 to the minimum value W2 and then increase up to the maximum value W1 again, and so on. In other words, on the whole, the core back 36 has a repeatedly patterned shape which repeats a certain shape eight times in the circumferential direction C along the eight sides of the octagon.

The stator 12 includes windings (not shown) wound around the teeth 32 through the slots 34. The windings act as electromagnets upon supply of electric power. The electric motor 10 is designed to generate driving torque for rotating the rotor 14 and the shaft 16 around the rotational axis, in cooperation of the windings of the stator 12 and the permanent magnets 24 of the rotor 14.

In the present embodiment, the stator 12 is provided with through holes 40, each of which extends on a line connecting the center of the stator 12 and the respective vertices of the stator core 30. The through holes 40 are equally distant from each other in the circumferential direction and extend substantially parallel to the rotational axis through the stator core 30. These through holes 40 are provided in position, as will be described below, so as to generate cogging torque at the opposite phases which would cancel out cogging torque generated due to a varied width of the core back 36 in the circumferential direction.

In a synchronous electric motor, it has been known that cogging torque is generated due to various factors. The inventors has discovered that when the core back has a repeatedly patterned shape which repeats a certain patterned shape a certain number of times in the circumferential direction as described above in relation to FIG. 1, so as to have a width in the radial direction which cyclically changes in the circumferential direction, cogging torque is generated due to the uneven width of the core back. In this case, it has been found that cogging torque is generated the same number of times, during one revolution of the electric motor, as a least common multiple of the number of repetition of the repeatedly patterned shape and of the number of magnetic poles of the rotor.

Generation of cogging torque as a result of an uneven width of the core back can be explained in association with magnetic saturation within the core back. For example, material 50A600 (JIS standards), which is widely used as an electromagnetic steel plate for the rotor core 20 and/or the stator core 30, generally reaches magnetic saturation when magnetic flux density increases up to about 1.5 T (Tesla). It should be noted that the smaller the width of the core back, the narrower a passageway for a magnetic flux becomes, and therefore magnetic saturation more likely occurs within the core back. Accordingly, with the core back having an uneven width, the core back starts to reach magnetic saturation locally at portions having a relatively small width, resulting in producing unevenly distributed magnetic energy. Consequently, as the rotor rotates, produced magnetic energy cyclically varies, and thus cogging torque is generated. It can be also understood that magnetic saturation resulting from a varied width of the core back in the circumferential direction tends to become increasingly problematic, as the size of the electric motor is smaller and a more powerful magnet such as a neodymium magnet is used.

Figure 11:
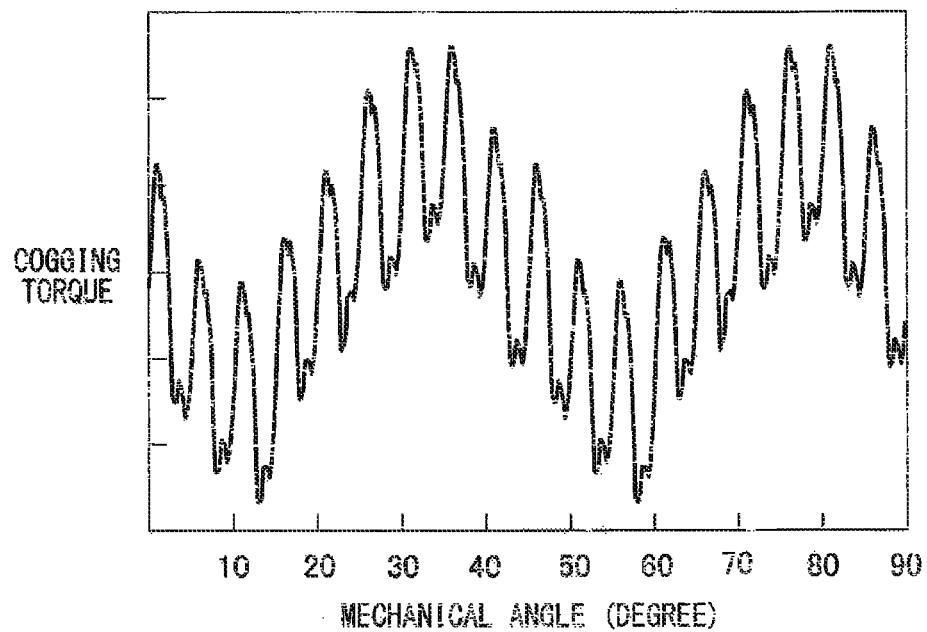
FIG. 11 shows a result of detection of cogging torque generated in an electric motor according to a first comparative example.

FIG. 11 shows a result of detection of cogging torque generated in an electric motor according to a first comparative example. The electric motor in this example is only different from the electric motor 10 shown in FIG. 1 in that it is not provided with a through hole 40. As can be seen in FIG. 11, cogging torque is generated during one revolution the same times as a least common multiple M1 (=72) of the number of slots formed on the stator (=36) and of the number of magnetic poles in the rotor (=8), as described in the Journal of the Institute of Electrical Engineers of Japan, Vol. 103-B, (1983), pages 711 to 718. In addition, the electric motor of this comparative example generates cogging torque the same times as a least common multiple M (=8) of the number of repetition of the repeatedly patterned shape of the core back (=8) and of the number of magnetic poles of the rotor (=8), during one revolution, as described above. In other words, in the electric motor of the example generates cogging torque comprised of two components in a 5-degree cycle and in a 45-degree cycle superposed on each other.

Figure 2:
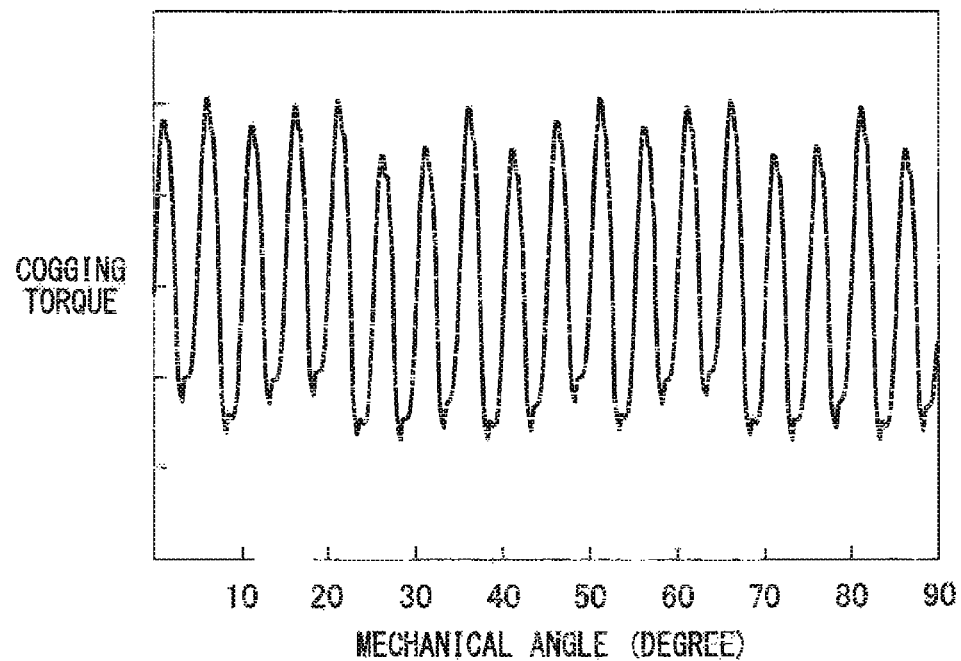
FIG. 2 shows a result of detection of togging torque generated in the electric motor of FIG. 1.

FIG. 2 shows a result of detection of togging torque generated in the electric motor 10 of FIG. 1. The electric motor 10 includes eight through holes 40 formed in the core back 36, and these through holes 40 function to cancel out the cogging torque generated in a 45-degree cycle. Therefore, as can be clearly shown in FIG. 2, the cogging torque in a 45-degree cycle is not detected in the electric motor 10 according to the present embodiment, but only the cogging torque in a 5-degree cycle is detected.

Figure 3A:
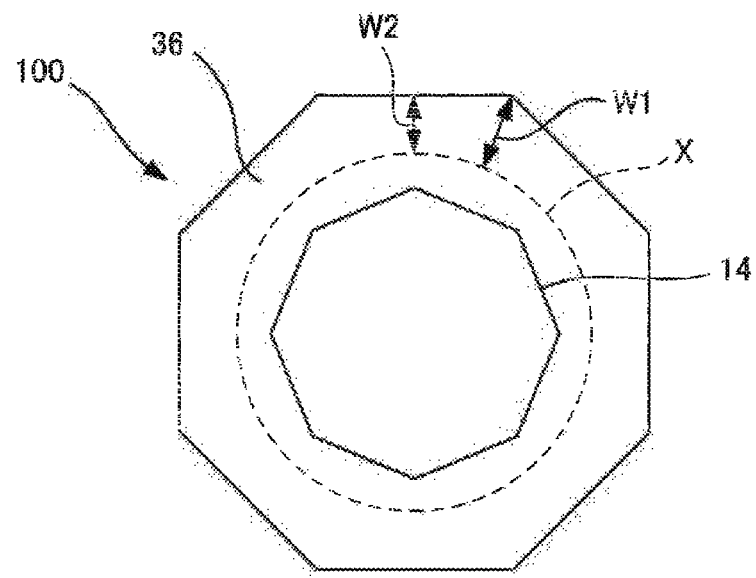
FIG. 3A is a conceptual diagram to explain a function of the electric motor according to the first embodiment.
Figure 3B:
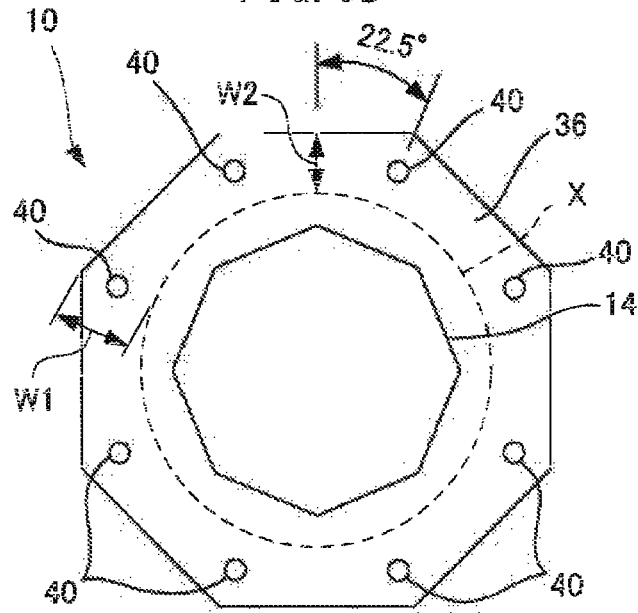
FIG. 3B is a conceptual diagram to explain a function of the electric motor according to the first embodiment.
Figure 3C:
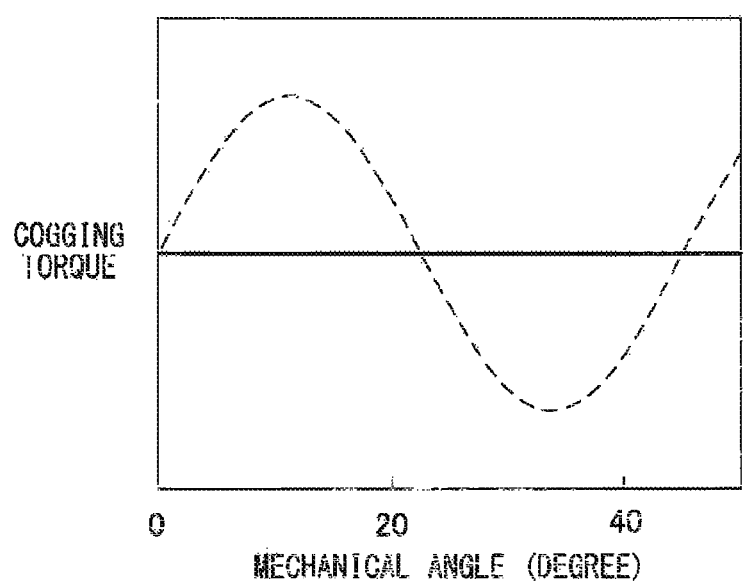
FIG. 3C is a diagram to explain a function of the electric motor according to the first embodiment.

FIGS. 3A to 3C are conceptual diagrams to explain a function of the electric motor 10 according to the first embodiment. FIGS. 3A and 3B conceptually show a configuration of the electric motor. Specifically, the core back 36 having a repeatedly patterned shape with eight times of repetition is shown as a regular octagon delimiting an outer edge of the core back 36 in FIGS. 3A and 3B. A circumscribed circle X extending through the bottoms of the respective slots 34 (or the bases of the teeth 32) of the stator 12 is shown by a dashed line. The rotor 14 is illustrated as a regular polygon having the same number of vertices as magnetic poles of the rotor 14. In this particular example, the rotor 14 is illustrated as a regular octagon. In these drawings, a distance between the core back 36 and the circumscribed circle X represents a width of the core back 36.

FIG. 3A shows an electric motor 100 formed with no through hole 40, whereas FIG. 3B shows the electric motor 10 formed with the through holes 40 at predefined positions, as described in relation to FIG. 1. The through holes 40 are provided so as to be distant in the circumferential direction by 22.5 degrees from a line extending through the midpoints of the respective sides of the core back 36, where the width W of the core back 36 takes up the minimum value W2. The electric motor 10 according to the present embodiment is designed to provide the core back 36 with a step shift in connection with a function as the stator 12 of the electric motor 10, by providing the through holes 40 of appropriate size and shape.

Figure 14A:
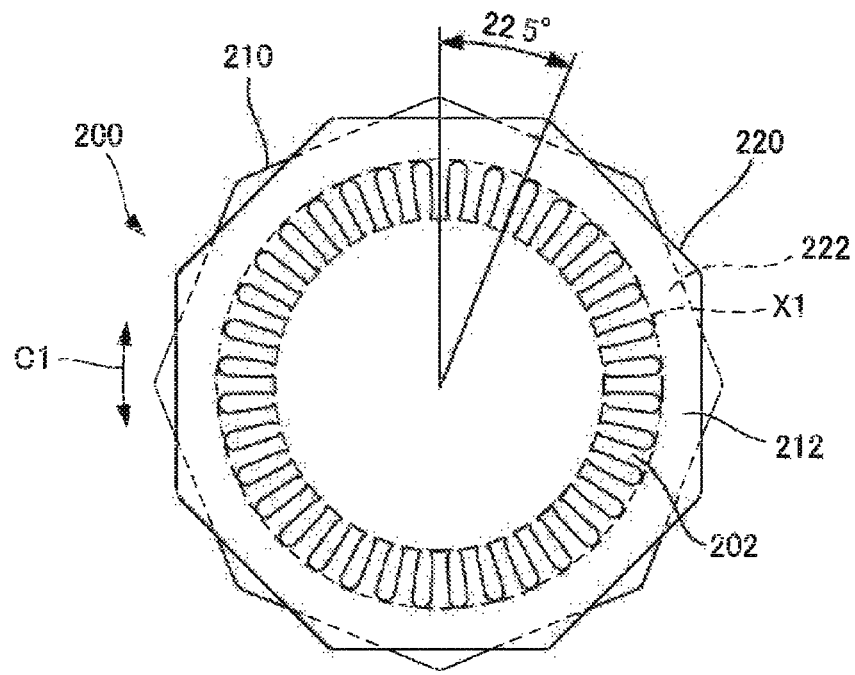
FIG. 14A is a diagram to explain a step shift of a core back.
Figure 14B:
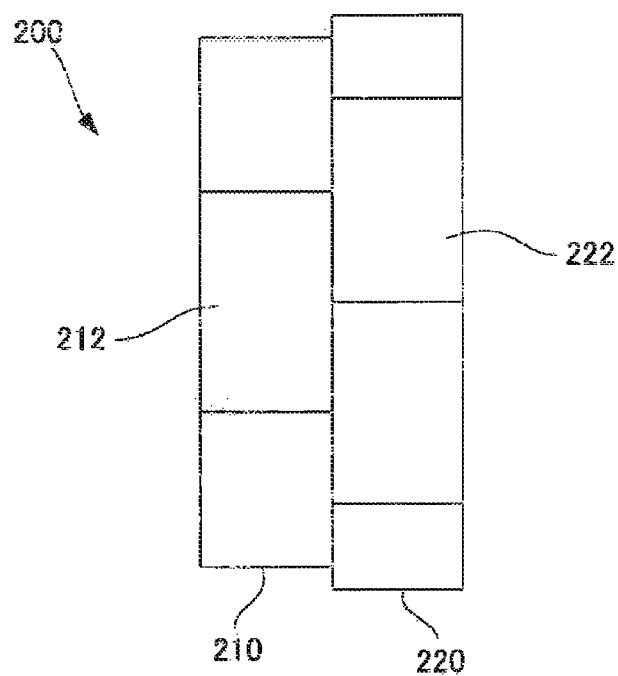
FIG. 14B is a diagram to explain a step shift of a core back.

FIGS. 14A and 14B are diagrams to explain a step shift of a core back. In FIGS. 14A and 14B, only a stator 200 is illustrated for simplification. FIG. 14A is an end view of the stator 200, and FIG. 14B is a side view thereof. The stator 200 includes a first stator core 210 and a second stator core 220. As shown in FIG. 14B, the first stator core 210 and the second stator core 220 are integrated together with the opposite end surfaces being in contact with each other. The first stator core 210 and the second stator core 220 have teeth 202 protruding radially inwardly, respectively. A first core back 212 is defined between a circumscribed circle X1 extending through bases of the teeth 202 and an outer circumferential edge of the first stator core 210. A second core back 222 is defined between the circumscribed circle X1 and an outer circumferential edge of the second stator core 220.

The first core back 212 and the second core back 222 both have a contour of regular octagon, and are shifted relative to each other by 22.5 degrees in a circumferential direction C1, as shown in FIG. 14A. In FIG. 14A, part of the second stator core 220 behind the first stator core 210, which cannot be actually seen, is depicted by a dashed line. The teeth 202 of the first stator core 210 and the second stator core 220 are designed to define angles matching each other. In the present disclosure, a "step shift" of the core back means a state where the core back is shifted by a certain angle relatively in the circumferential direction, as illustrated.

Figure 14C:
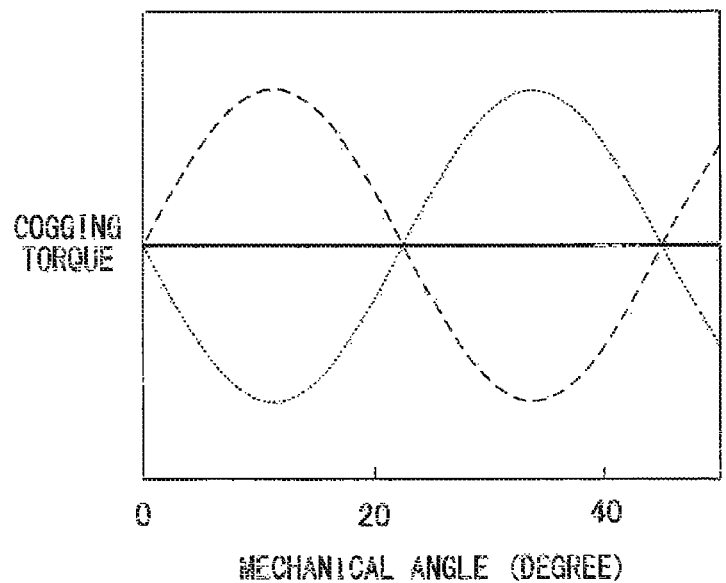
FIG. 14C shows a waveform of cogging torque detected in an electric motor in which its core back is provided with a step shift.

FIG. 14C shows a waveform of cogging torque detected in an electric in which its core back is provided with a step shift. According to this embodiment, the electric motor includes a rotor with eight magnetic poles. A dashed line in FIG. 14C shows a waveform of cogging torque detected in the electric motor including only the above-described first core back 212. A dotted line in FIG. 14C shows a waveform of cogging torque detected in the electric motor including only the above-described second core back 222. A solid line in FIG. 14C shows a waveform of cogging torque detected in the electric motor including both of the first core back 212 and the second back core 222, or in other words, the electric motor including a core back provided with a step shift. Since the first core back 212 and the second core back 222 has a contour of regular octagon, respectively, cogging torque is generated in a 45-degree cycle, i.e., eight times during one revolution, in accordance with the least common multiple (=8) of the number of repetition of the core back shape (=8) and of the number of magnetic poles (=8). However, the first core back 212 and the second core back 222 have been shifted by 22.5 degrees in relation to each other, as described above. Accordingly, as clearly seen in comparison with the waveforms shown by the dashed line and by the dotted line in FIG. 14C, the electric motor including the second core back 222 results in generating cogging torque shifted by 22.5 degrees in phase, as opposed to the electric motor including the first core back 212.

In contrast, the electric motor which includes the core back provided with the step shift generates, on the whole, superposed cogging torque comprised of the cogging torque shown by the dashed line and the cogging torque shown by the dotted line. In this case, as a result of superposing the waveforms at opposite phases, the cogging torque which is generated due to the varied width of the core back in the circumferential direction is canceled out and removed.

Figure 15:
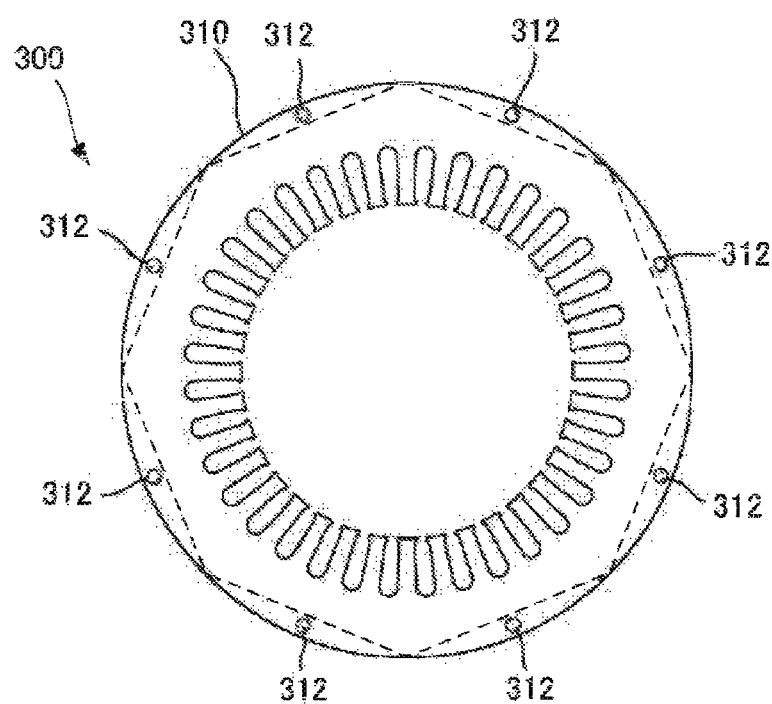
FIG. 15 is a diagram to explain a step shift of a core back by through holes formed in a stator core.

FIG. 15 is a diagram to explain a step shift of a core back by through holes formed in a stator core. FIG. 15 shows a stator 300 including a stator core 310 of a substantially cylindrical shape. The stator core 310 is provided with eight through holes 312 spaced apart from each other by 45 degrees. Part of the stator core 310 where the through holes 312 are provided does not substantially function as a passageway for a magnetic flux. Accordingly, the core back with the through holes 312 produces the same effect as the core back having a smaller width. Thus, the stator core 310 geometrically having a circular shape functions as if it had an octagonal contour as shown by a dashed line in FIG. 15. By providing such through holes to the stator 12 having the core back 36 of an octagonal contour, for example, as shown in FIG. 1, the core back can have both properties as a core back 36 having a geometric shape of regular octagon and as a core back having a virtual shape of regular octagon which is angularly shifted as a result of forming the through holes 40. Accordingly, the core back with the through holes 40 is considered to be virtually equivalent to a core back described above in relation to FIGS. 14A and 14B, which is actually provided with a step shift.

FIG. 3C shows waveforms of cogging torque generated in the electric motors shown in FIGS. 3A and 3B, respectively. A dashed line in the drawing shows a waveform of cogging torque in the electric motor 100 of FIG. 3A, while a solid line in the drawing shows a waveform of cogging torque in the electric motor 10 of FIG. 3B. In the electric motor 100 of FIG. 3A having no through hole 40, cogging torque is generated in a 45-degree cycle, as described above, i.e., eight times during one revolution, which is the same number as the least common multiple M of the number of repetition of the core back 36 (=8) and of the number of magnetic poles of the rotor 14 (=8). On the other hand, in the electric motor 10 of FIG. 3B, which is provided with the through holes 40, no cogging torque is detected. It is because the core back 36 of the electric motor 10 can be considered to virtually undergo a step shift as described above, due to the through holes 40 formed in the core back 36. The electric motor 10 shown in FIG. 3B thus includes the core back 36 which functions in the same way as a core back provided with a step shift, thereby generating cogging torque at the opposite phase so as to cancel out the cogging torque in a 45-degree cycle. Thus, as a result of superposing the two waveforms on each other, cogging torque is removed as shown in FIG. 3C.

When cogging torque is generated M times during one revolution of the electric motor, or in other words, when cogging torque is generated in a cycle of (360/M) degrees, in order to cancel out the cogging torque, it is necessary to generate cogging torque at shifted phase by (360/M/2) degrees multiplied with an odd number. Accordingly, it is necessary to provide through holes 40 in position, so as to provide the core back with a step shift by an angle obtained by multiplying (360/M/2) degrees with a given odd number. In the illustrated embodiment, in order to cancel out cogging torque generated eight times during one revolution (i.e., in the case of M=8), the through holes 40 are formed in positions distant by 22.5 degrees from the middle points of the respective sides of the core back 36 where the width W of the core back 36 takes up the minimum value W2. It should be noted that the size and shape of the through holes 40 can be optimized, based on cogging torque detected during actual operation of the electric motor 10.

As stated above, according to the present embodiment, the through holes 40 are provided so as to generate cogging torque at the opposite phase, in order to cancel out cogging torque generated due to the repeatedly patterned shape of the core back 36. It is thus possible to reduce cogging torque in the case of, for example, a smaller electric motor or an electric motor involving use of magnets having a greater magnetic force, even when the width of the core back is uneven.

Subsequently, other embodiments of the present invention will be described. Matters which have already been described will be omitted from the following explanation. The same or corresponding constituent elements will be designated with the same reference numerals.

Figure 4A:
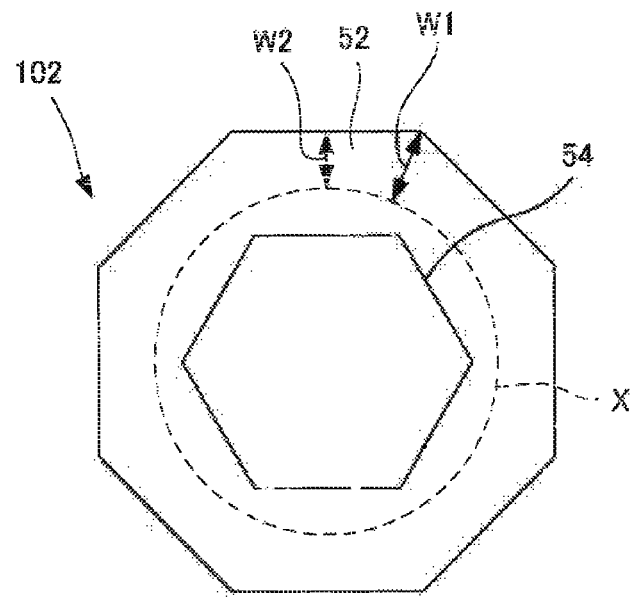
FIG. 4A is a conceptual diagram to explain an electric motor according to a second embodiment.
Figure 4B:
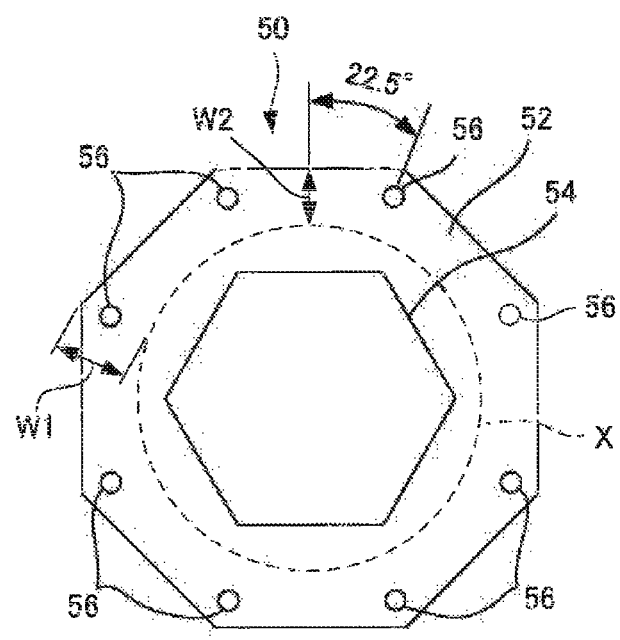
FIG. 4B is a conceptual diagram to explain the electric motor according to the second embodiment.

FIGS. 4A and 4B are conceptual diagrams to explain an electric motor 50 according to a second embodiment. FIGS. 4A and 4B conceptually show the electric motors in the same way as FIGS. 3A and 3B. Specifically, a core back 52 of a repeatedly patterned shape having a repetition number of eight is shown by a regular octagon. A rotor 54 according to the present embodiment has six magnetic poles, and therefore the rotor 54 is shown by a regular hexagon. FIG. 4B illustrates the electric motor 50 provided with through holes 56 for canceling out cogging torque generated due to an uneven width of the core back 52, while FIG. 4A illustrates an electric motor 102 having no such a through hole 56. Referring to FIG. 4B, the through holes 56 are provided in positions shifted by 22.5 degrees from the midpoints of the respective sides of the core back 52 where the width W of the core back 52 takes up the minimum value W2. The through holes 56 are accordingly provided in position, so as to provide the core back 52 with a step shift of 22.5 degrees.

The electric motor 50 shown in FIG. 4B will now be described in connection with a calculation formula for obtaining an appropriate position where the through holes 56 should be provided. In the electric motor 50 according to the present embodiment, during one revolution, cogging torque is generated the same number of times as a least common multiple M (=24) of the number of repetition of the repeatedly patterned shape of the core back 52 (=8) and of the number of magnetic poles of the rotor 54 (=6). Thus, the cogging torque is generated in a 15-degree cycle, and it is necessary to provide the core back 52 with a step shift by an angle obtained by multiplying (360/M/2) degrees with an odd number. As described above, since M is equal to twenty-four in the present embodiment, the following relation can be obtained:

(360/*M*/2)=(360/24/2)=7.5.

The above-described step shift of 22.5 degrees can be obtained by multiplying 7.5 degrees with an odd number. Therefore, the electric motor 50 according to the present embodiment allows cogging torque generated due to the uneven width of the core back 52 to be canceled out.

Figure 5:
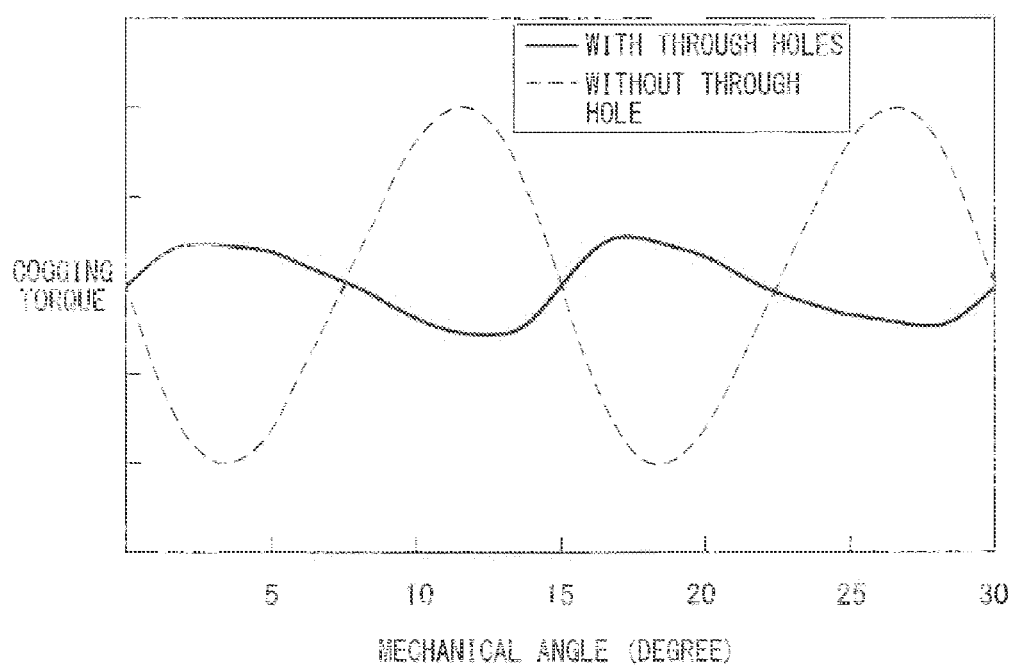
FIG. 5 shows a result of detection of cogging torque generated in the electric motor of FIGS. 4A and 4B.

FIG. 5 shows a result of detection of cogging torque generated in the electric motors of FIGS. 4A and 4B. In FIG. 5, a solid line represents a waveform of cogging torque generated in the electric motor 50 of FIG. 4B provided with the through holes 56 for canceling out cogging torque, while a dashed line represents a waveform of cogging torque generated in the electric motor 102 of FIG. 4A provided with no such a through hole 56. In comparison with these waveforms, it can be seen that the cogging torque generated in a 15-degree cycle has been canceled out by cogging torque at the opposite phase generated due to the through holes 45 provided in position, so that the detected cogging torque can be reduced.

Figure 6:
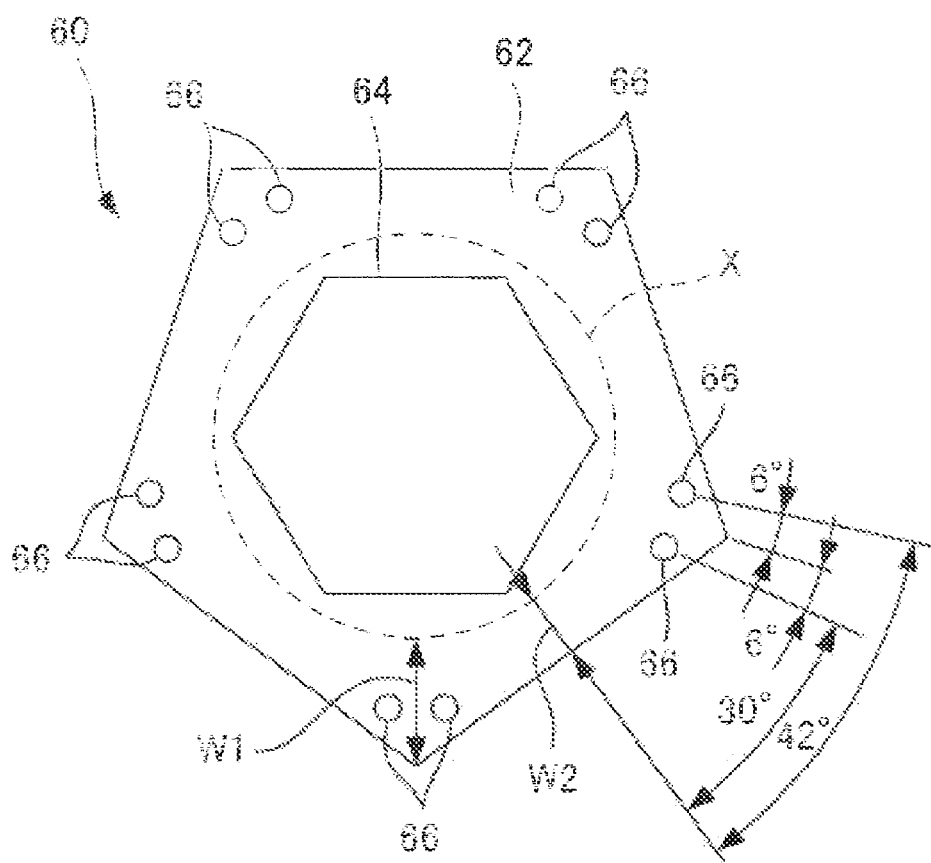
FIG. 6 is a conceptual diagram to explain an electric motor according to a third embodiment.

FIG. 6 is a conceptual diagram to explain an electric motor 60 according to a third embodiment. The electric motor 60 includes a core back 62 having a repeatedly patterned shape with a repetition number of five. The core back 62 is thus depicted as a regular pentagon. A distance between the core back 62 and a circumscribed circle X in a radial direction represents a width W of the core back 62. The rotor 64 has six magnetic poles, and is depicted as a regular hexagon. In the electric motor 60, a least common multiple M of the number of repetition (=5) and of the number of magnetic poles (=6) is 30. Accordingly, the electric motor 60 generates cogging torque thirty times during one revolution, or in other words, generates cogging torque in a 12-degree cycle. In this case, it is necessary to provide the core back 62 with a step shift by an angular obtained by multiplying 6 degrees with an odd number, since the following relation is satisfied:

(360/*M*/2)=(360/30/2)=6.

The electric motor 60 according to the present embodiment is provided with through holes 66 at 30 degrees and 42 degrees, respectively, from a reference position at the midpoints of the respective sides of the core back 62 where the width W of the core back 62 takes up the minimum value W2. It should be noted that 30 degrees and 42 degrees are obtained by multiplying 6 degrees with odd numbers, respectively. In other words, a pair of through holes 66 are provided in positions shifted by ±6 degrees in the circumferential direction from a line extending through the vertex of the core back 62 where the width W of the core back 62 takes up the maximum value W1. According to the present embodiment, a pair of the through holes 66 are formed in the respective repetitive shapes of the repeatedly patterned shape of the core back 62, so as to be positioned symmetrically relative to each other. For example, in the case where the through hole 66 is provided only in a position shifted by +6 degrees from the vertex position, the above-described cogging torque in a 12-degree cycle can be reduced. However, since the core back 62 has an asymmetrical shape because of the through hole 66 in this case, as a result of which cogging torque is generated. For this reason, in the case where a plurality of through holes 66 are formed in the respective repetitive shapes of the repeatedly patterned shape of the core back, it is desirable that the through holes 66 are positioned symmetrically relative to one another on the whole.

Figure 7:
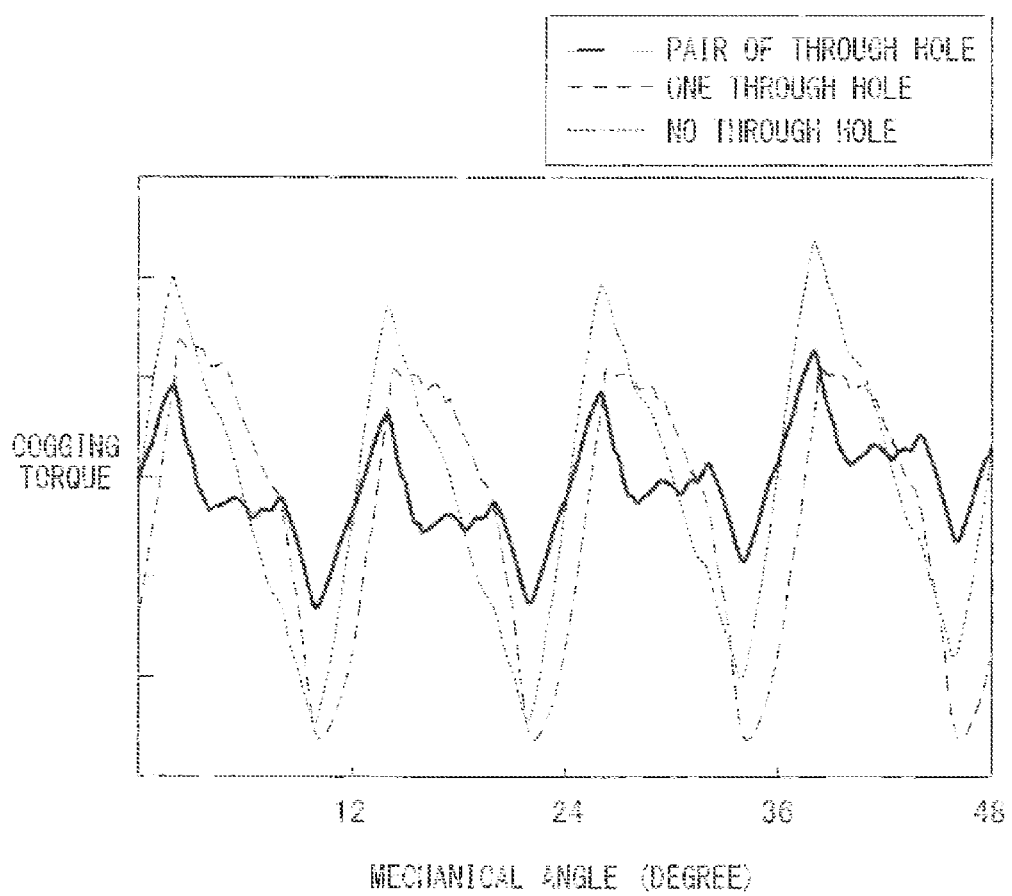
FIG. 7 shows a result of detection of cogging torque generated in the electric motor of FIG. 6.

FIG. 7 shows a result of detection of cogging torque generated in the electric motor 60 of FIG. 6. A solid line in FIG. 7 represents a waveform of cogging torque generated in the electric motor 60 having a pair of through holes 66 formed in the respective repetitive shapes of the core back, so as to provide the core back with step shifts by 30 degrees and 42 degrees, respectively. A dashed line represents a waveform generated in an electric motor having only one through hole 66 formed in the respective repetitive shapes of the core back, so as to provide the core back with a step shift either by 30 degrees or by 42 degrees. A dotted line represents a waveform of cogging torque generated in an electric motor having no through hole 66 at all. Referring to FIG. 7, it can be seen that even in the case where only one through hole 66 is formed in order to provide a step shift either by 30 degrees or by 42 degrees, cogging torque can be in fact reduced, as compared to the case where no through hole 66 is formed. It can also be seen that cogging torque can be reduced even further, when a pair of through holes 66 are formed in the core back 62 in order to provide the core back 62 with the step shifts by 30 degrees and 42 degrees, respectively.

Figure 12:
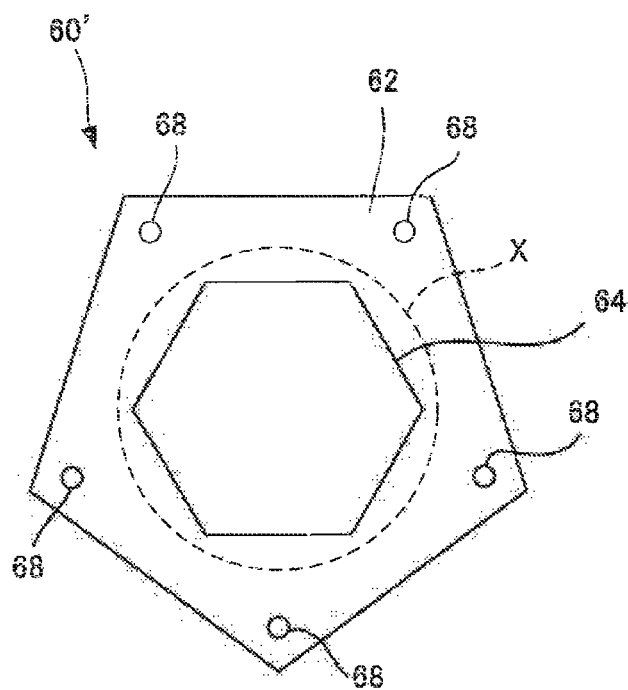
FIG. 12 is a conceptual diagram illustrating an electric motor according to a second comparative example.

FIG. 12 is a conceptual diagram illustrating a configuration of an electric motor 60' according to a second comparative example. The electric motor 60' in this example includes a core back 62 provided with through holes 68 on lines connecting the vertices and the center of the core back 62. With the through holes 66 positioned so as to correspond to the vertices of the core back 62, the width of the core back 62 becomes more uniform in the circumferential direction. Thus, it can be expected that cogging torque can be reduced in this configuration. However, in this comparative example, the core back 62 is provided with a step shift by 36 degrees, whereas relation (360/M/2)=6 is satisfied. Thus, 36 degrees are obtained by multiplying 6 degrees with an even number, rather than an odd number. Therefore, reduction of the cogging torque cannot be achieved in this case. FIG. 13 shows a result of detection of cogging torque generated in the electric motor 60' according to the second comparative example. A dashed line in FIG. 13 represents a waveform of cogging torque generated in the electric motor 60' provided with the through holes 68. A solid line in FIG. 13 represents a waveform of cogging torque generated in an electric motor provided with no such a through hole 68. Accordingly, it is not necessarily ensured that cogging torque can be sufficiently reduced by forming through holes in position so as to correspond to the vertices of a regular polygon.

Figure 8A:
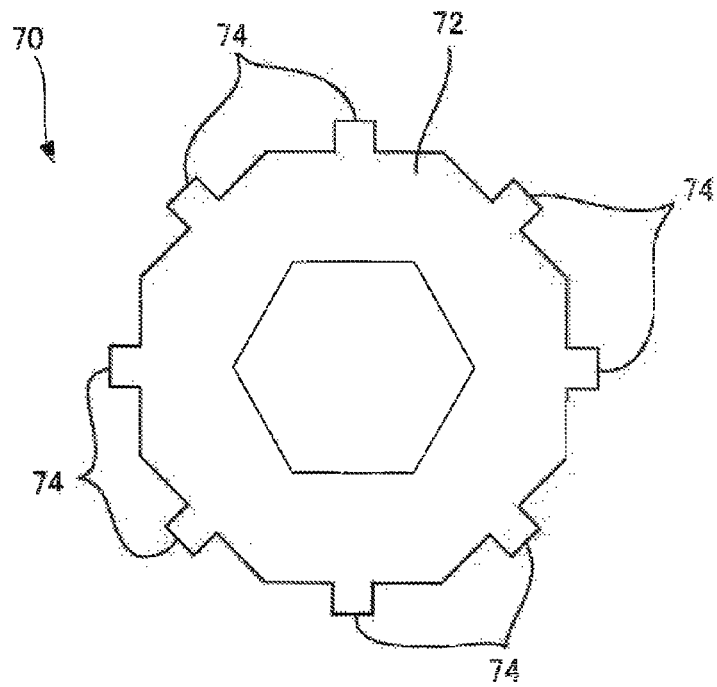
FIG. 8A is a conceptual diagram illustrating an electric motor according to one variant.

FIG. 8A is a conceptual diagram illustrating an electric motor 70 according to one variant. In the above-described embodiments, through holes are formed in the core back, in order to generate cogging torque at the opposite phase and cancel out cogging torque generated due to an uneven width of the core back. However, in order to generate cogging torque at the opposite phase, a core back 72 may also be provided with convex portions 74, as shown in FIG. 8A, instead of the through holes. In this variant, the core back 72 includes the convex portions 74. In the illustrated variant, the core back 72 is provided with the convex portions 74 at the midpoints of the respective sides thereof, but the present invention is not limited to such a specific configuration.

Figure 16:
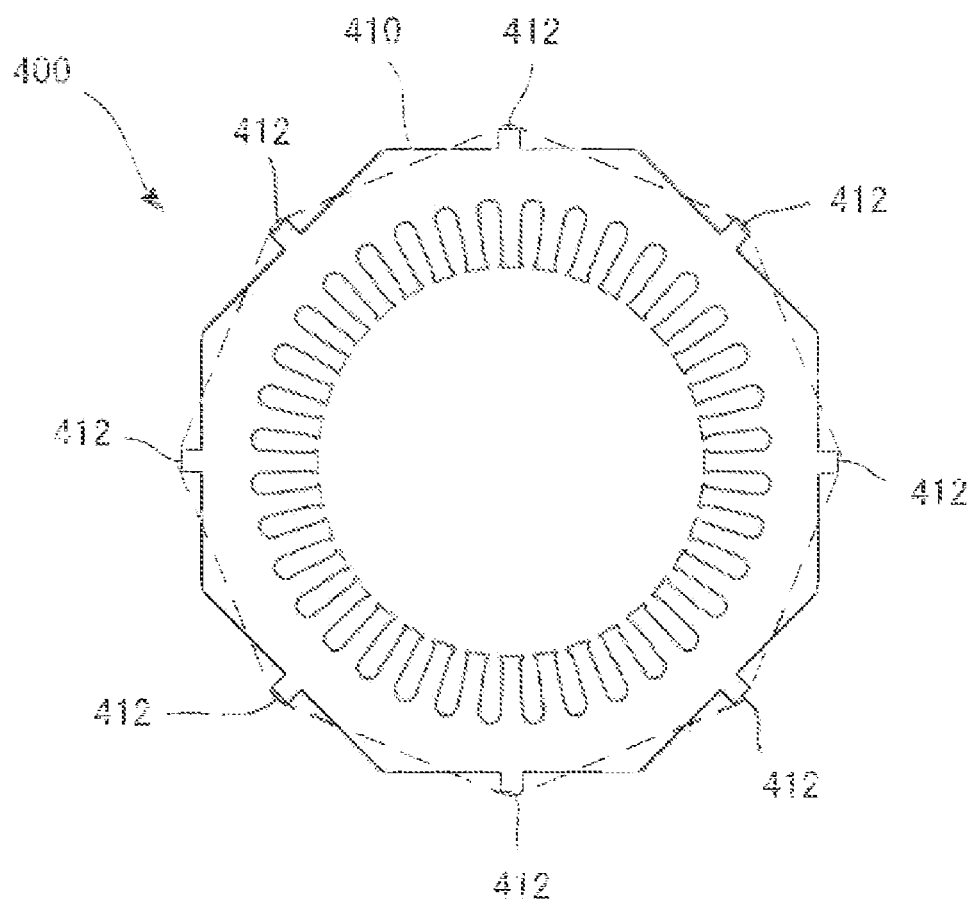
FIG. 16 is a diagram to explain a step shift of a core back by convex portions provided on a stator core.

FIG. 16 is a diagram to explain a step shift of a core back by providing a stator core with convex portions. FIG. 16 shows a stator 400 including a stator core 410 having a contour of a regular octagon. The stator core 410 has eight convex portions 412 spaced apart from each other by 45 degrees. Part of the stator core 410 where the convex portions 412 are situated defines a larger passageway for a magnetic flux, and therefore the same effect can be achieved as in the case where the width of the core back is increased in a cyclic manner. As a result, the core back is virtually provided with a step shift by 22.5 degrees. The core back then has both properties as a core back having a geometric shape of a regular octagon corresponding to an contour of the stator core 410, and as a core back having a virtual shape of a regular octagon as shown by dashed line in FIG. 16.

Figure 8B:
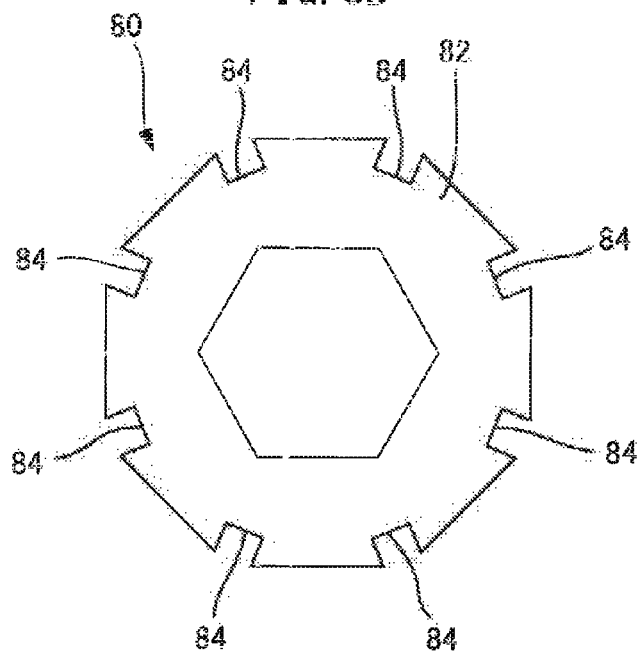
FIG. 8B is a conceptual diagram illustrating an electric motor according to another variant.

FIG. 8B is a conceptual diagram illustrating an electric motor 80 according to another variant. The electric motor 80 is provided with concave portions 84 depressed radially inwardly from an outer edge of the core back 82. The concave portions 84 make the width of the core back smaller, the same effect of providing the core back with a step shift can be achieved as in the above case where through holes are provided. Accordingly, also by forming the concave portions 84, cogging torque at the opposite phase can be generated so as to cancel out cogging torque generated due to an uneven width of the core back 82. Although the concave portions 84 are situated at the vertices of the core back 82 in the illustrated variant, the present invention is not limited to such a specific configuration.

FIG. 9 is a conceptual diagram illustrating an electric motor 90 according to yet another variant. The electric motor 90 shown in FIG. 9 includes a core back 92 having a substantially square shaped end face, and the core back 92 is cut off at its corners 92a along circular arcs 92b. Such a core back 92 with the corners 92a cut off is used to allow screws to be inserted for the purpose of fixing the stator to an attachment such as a flange. Since the core back 92 of the electric motor 90 cyclically varies in width in this case as well, cogging torque is generated a certain number of times during one revolution, in accordance with a relationship between a width of the core back varying in the circumferential direction and magnetic poles of the rotor. In order to reduce such cogging torque, the core back 92 is provided with through holes, convex portions or concave portions (not shown), so as to shift the phase of the core back 92 by an angle obtained by multiplying (360/M/2) degrees with an odd number, provided that cogging torque is generated M times during one revolution, in a similar way as other embodiments described above.

As described above in relation to FIG. 9, a repeatedly patterned shape of the core back in the present invention is not limited to a regular polygon. However, it is rather difficult to predict as to how many times cogging torque is generated in an electric motor including the core back having a more complicated shape than a regular polygon. Therefore, a test should be performed for such an electric motor before through holes or the like are formed. By analyzing a waveform of cogging torque detected as a result of the test, through holes or the like can be provided so as to cancel out the detected cogging torque. For example, if it is determined that cogging torque is generated in a cycle of 45 degrees as a result of analysis, it is necessary to provide the core back with through holes, so as to provide the core back with a step shift by 22.5 degrees. Even in the case where cogging torque includes multiple components, i.e., where cogging torque is generated in different cycles, cogging torque can be reduced independently of each other, by individually forming corresponding through holes or the like in position. For example, in the case where cogging torque includes a component in which cogging torque is generated M times during one revolution, and a different component in which cogging torque is generated N times during one revolution, it is necessary to provide the core back with a step shift by an angle obtained by multiplying (360/M/2) degrees with an odd number, and also a step shift of an angle obtained by multiplying (36/N/2) degrees with an odd number.

Figure 10:
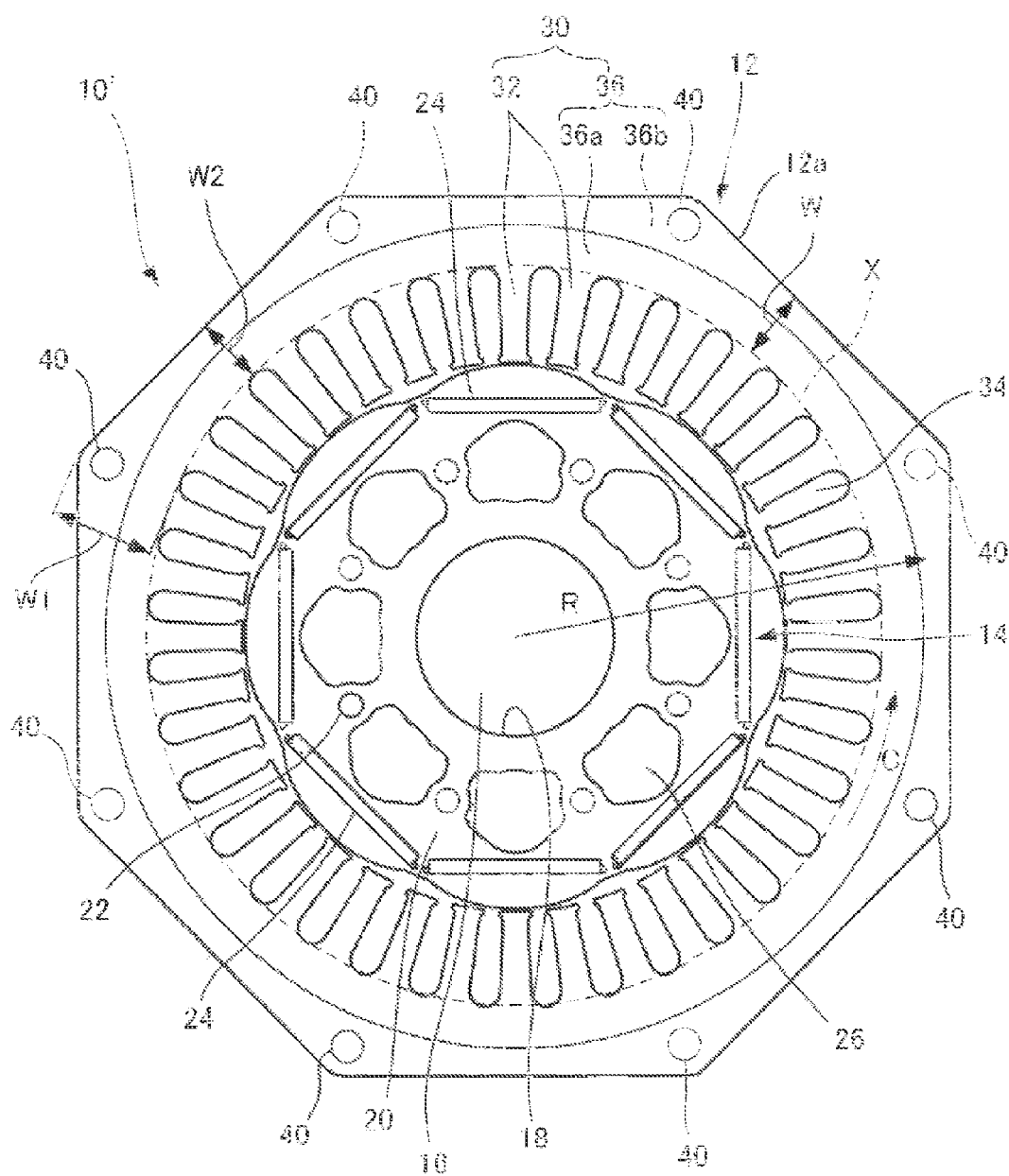
FIG. 10 is a sectional view illustrating an electric motor according to another variant.

FIG. 10 is a sectional view illustrating an electric motor 10' according to another variant. The electric motor 10' in this variant includes a core back 36 formed from separate two parts: an inner core back 36a situated on an inner side in a radial direction R; and an outer core back 36b situated on an outer side in the radial direction R. The present invention may also apply to an electric motor in which the core back 36 are formed from two or more separate parts.

As an example of the core back of the stator provided with a step shift, the core back with an actual step shift and the core back with a virtual step shift by way of forming through holes, convex portions or concave portions have been described. However, both types of the embodiments fall within the scope of the present invention. The core back with an actual step shift can be advantageously produced at lower cost, only by modifying the shape of the stator core, in order to achieve an expected result. On the other hand, the core back having through holes, convex portions or concave portions advantageously facilitates replacement of the conventional electric motor, since it is not necessary to modify the shape of the stator and therefore the shape of the electric motor.

Although various embodiments have been described, it is evident that a person skilled in the art would be able to implement the present invention by combining any features of those embodiments either explicitly or implicitly disclosed herein. In addition, the concepts of the present invention may also apply to any type of electric motor other than the illustrated embodiment, except for an application clearly giving rise to a technical problem. For example, although the electric motor in the illustrated embodiments has a configuration in which permanent magnets are embedded inside the rotor core, it is evident to a person skilled in the art that the present invention may also apply to another type of electric motor in which permanent magnets are adhered to a surface of the rotor. Accordingly, the concepts of the present invention can widely apply to any other type of electric motor in which a width of its core back varies in a cycle in a circumferential direction.

If an electric motor includes an additional casing as described above, and the additional casing has a magnetic property to the extent that the casing and the core back can be considered to define an integrated passageway for a magnetic flux, it should be understood that the width of the core back in this context corresponds to a combined width of the core back and the casing. Thus, the present invention can apply to the electric motor in which a combined width of the core back and the casing varies in a cycle in a circumferential direction. In this way, in relation to the present invention, the core back and therefore the stator may also be construed as including a casing made of a magnetic material.

Effect of the Invention

If the core back has an uneven width, magnetic saturation in the core back tends to locally occur. Thus, in particular, in the case where it is desirable to design a smaller electric motor, or where the magnets for producing a greater magnetic force are employed, cogging torque can be problematic. However, according to the present invention, cogging torque generated due to an uneven width of the core back can be diminished.

Although the invention has been shown and described with exemplary embodiments thereof, it should be understood by those skilled in the art that the foregoing and various other changes, omissions and additions may be made therein and thereto without departing from the spirit and scope of the invention.

What is claimed is:

1. An electric motor comprising a stator provided with slots spaced apart from each other in a circumferential direction and with windings wound around through the slots, and a rotor provided with permanent magnets spaced apart from each other in the circumferential direction and adapted to cooperate with the windings to produce driving torque,
   wherein the stator includes a core back extending between a circumscribed circle extending through a radially outer edge of the slots and a radially outer edge of the stator, the core back having a size defined in a radial direction, which varies in the circumferential direction,
   wherein the electric motor is adapted to generate cogging torque M times during one revolution of the rotor, M being a least common multiple of the number of magnetic poles of the rotor and the number of repetition of repeatedly patterned shape of the core back, and
   wherein the core back is a step-shifted core back including a plurality of core backs, each of which is provided with a step shift by an angle obtained by multiplying (360/M/2) degrees with an odd number in the circumferential direction, or the core back is a virtually step-shifted core back adapted to cancel out the cogging torque equivalently to the step-shifted core back.

2. The electric motor according to claim 1, wherein the core back including holes, concave portions or convex portions, so as to provide the virtually step-shifted core back.

3. The electric motor according to claim 1, wherein the core back has a contour of a regular polygon.

4. The electric motor according to claim 2, wherein the electric motor is adapted to generate cogging torque N times during one revolution of the rotor, separately from the cogging torque generated M times during one revolution of the rotor, due to the number of magnetic poles of the rotor and the varied size of the core back,
   wherein the core back includes additional holes, concave portions or convex portions, so as to cancel out the cogging torque equivalently to a step-shifted core back including a plurality of core backs, each of which is provided with a step shift by an angle obtained by multiplying (360/N/2) degrees with an odd number in the circumferential direction.

5. The electric motor according to claim 2,
   wherein the holes, the concave portions or the convex portions of the core back are equally spaced apart from each other in the circumferential direction.

6. The electric motor according to claim 2, wherein the holes, the concave portions or the convex portions of the core back forms a group of holes, concave portions or convex portions, the holes, the concave portions or the convex portions in the respective group are arranged in a symmetrical manner relative to one another.

* * * * *